United States Patent

Weider

[15] 3,638,981
[45] Feb. 1, 1972

[54] STRUCTURAL LOCK FOR CONNECTING HORIZONTAL AND VERTICAL MEMBERS

[72] Inventor: John J. Weider, Arlington Heights, Ill.
[73] Assignee: Speedrack Inc., Skokie, Ill.
[22] Filed: Nov. 24, 1969
[21] Appl. No.: 879,116

[52] U.S. Cl. .................................. 287/189.36, 211/177
[51] Int. Cl. ........................................... F16b 7/00
[58] Field of Search ........ 287/189.36 R, 189.36 C, 189.36 F, 287/189.36 H, 54 A, 54 B, 54 C, 20.92 R, 20.92 C, 20.92 D; 211/182, 183, 177

[56] References Cited

UNITED STATES PATENTS

| 2,932,368 | 4/1960 | Schell | 287/189.36 |
| 3,186,527 | 6/1965 | Konstant et al. | 287/54 C X |
| 3,468,574 | 9/1969 | Schell | 287/189.36 |

*Primary Examiner*—David J. Williamowsky
*Assistant Examiner*—Wayne L. Shedd
*Attorney*—Fitch, Even, Tabin & Luedeka

[57] ABSTRACT

A structural lock for connecting a horizontal arm to a vertical column designed to positively prevent inadvertent disengagement. Two separate connections are made at opposite sides of the column to lock the end of the horizontal arm to the column. The first connection is pivotal about a vertical axis, and it is then required that the arm be pivoted into position to subsequently make the second connection on the opposite side of the column. Loading of the arm causes firmness of the lock to increase.

4 Claims, 4 Drawing Figures

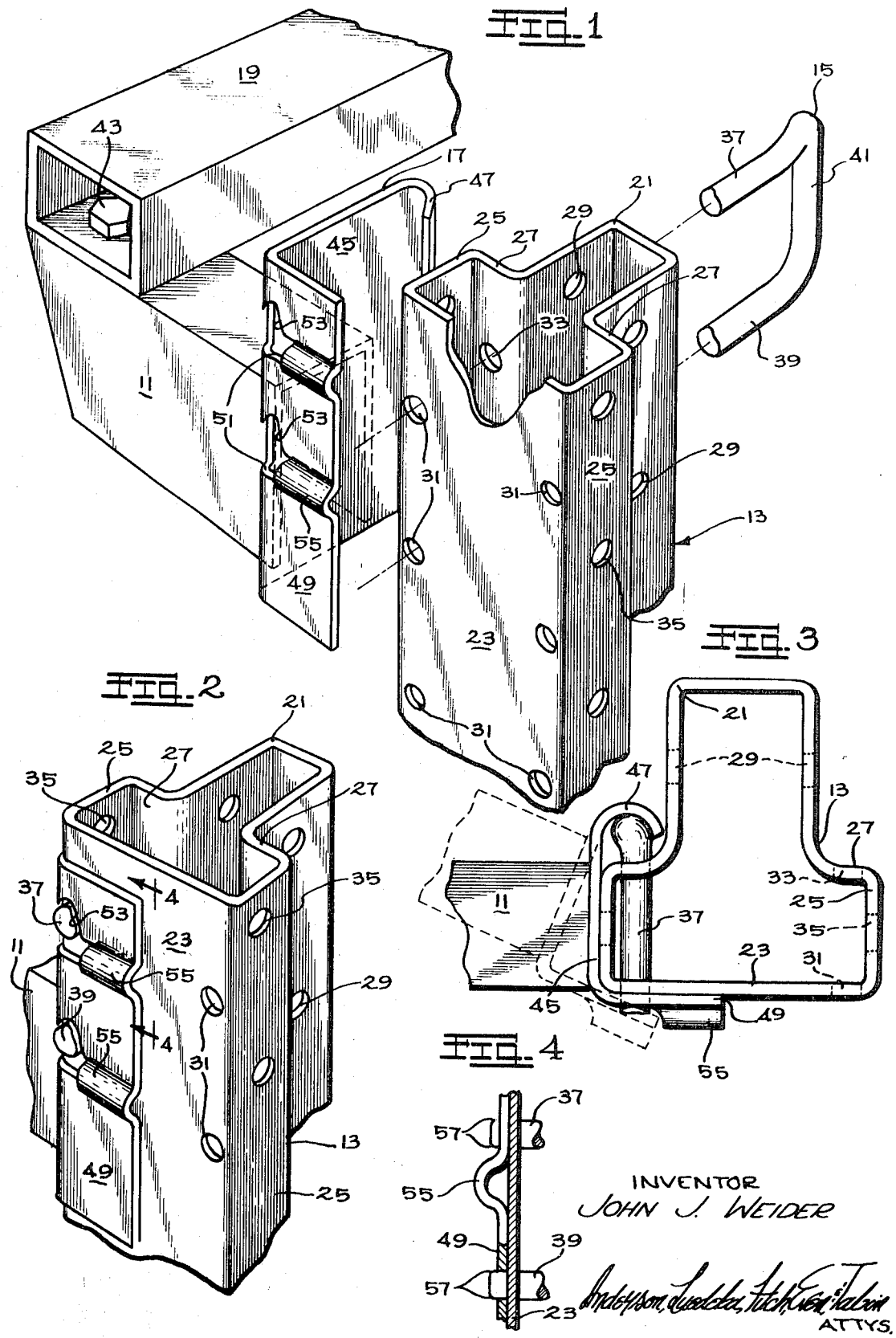

STRUCTURAL LOCK FOR CONNECTING HORIZONTAL AND VERTICAL MEMBERS

This invention relates to a device for interconnecting a horizontal structural member to a vertical structural member and more particularly to a structural lock for connecting a horizontal load support member to a vertical column which is easily assemblable and disassemblable.

U.S. Pat. No. 2,932,368, issued Apr. 12, 1960 in the name of Burt E. Schell, Jr., illustrates one form of a very satisfactory arrangement for detachably interconnecting structural members. This structural lock utilizes pin and slot connections which are perpendicularly disposed to each other, and it has proved extremely effective in achieving a very firm connection between horizontal and vertical structural members, which connection can be quickly made and readily released. As such, the lock has found ready application in the storage field.

The lock is illustrated in the above-identified patent in a storage rack to join a horizontal beam at each end thereof to a vertical column. The firmness of the connection of the structural lock and its easy detachability has rendered it extremely well suited for use in adjustable storage racks wherein periodically it may be desirable to change the location of such a horizontal beam or to change the overall configuration of the storage structure. The structural lock shown in this patent was not designed specifically for the connection of a short load support arm which is supported only at the location of its connection to a column or to support longer beams of the cantilever type. Although the lock can be used for such applications, structural locks particularly designed to meet the specific requirements of such applications are desired.

An object of the present invention is to provide an improved locking arrangement for connecting a horizontal structural member to a vertical structural member. Another object of the present invention is to provide an improved structural lock for connecting a cantilever beam or the like to a vertical column. A further object of the invention is to provide an improved locking arrangement which can be employed to connect a pair of relatively short horizontal load support arms to opposite sides of a vertical column at the same vertical location. Still another object is to provide a structural connection of the above type which can be readily assembled and disassembled and which is extremely rigid and strong.

Other objects and advantages of the invention will be apparent by reference to the following detailed description when read in conjunction with the accompanying drawings wherein:

FIG. 1 is an exploded fragmentary perspective view of a vertical column, a locking pin and a horizontal member and connector of a structural lock embodying various features of the invention;

FIG. 2 is an assembled fragmentary perspective view showing the elements depicted in FIG. 1 in the lock position;

FIG. 3 is a plan view of the structure shown in FIG. 2, having illustrated in dotted outline the location of the connector in an intermediate position as it is being pivoted into the lock position; and FIG. 4 is a fragmentary sectional view taken along lines 4—4 of FIG. 2.

It has been found that a strong, rigid and easily assemblable structural lock is created employing a removable locking pin and a separable connector which cooperate to provide points of connection in spaced-apart parallel planes. Easy assemblability and disassemblability in such a structural lock is provided by making the connection in one of the planes between the locking pin and the connector a pivotal one which allows the connections in the different planes to be made serially rather than simultaneously.

Referring specifically to FIG. 1, a structural lock is illustrated for connecting a short horizontal load support arm 11 to a vertical column 13 via the employment of a separable generally U-shaped locking pin 15 and a cooperating connector 17 which is rigidly affixed, as by welding, to the end of the horizontal load support arm 11. In the illustrated embodiment, the horizontal arm 11 is used to support a horizontal longitudinal rail 19 as it would be employed in a drive-in storage rack or the like, such as that illustrated in U.S. Pat. No. 2,963,169, issued Dec. 6, 1960 in the name of Anthony N. Konstant. However, the lock may also be advantageously employed to support longer cantilever arms or the like.

The illustrated vertical column 13 has the general shape of a T in horizontal cross section; however, the column may, and perhaps more often will, be a simple rectangular tube. The column may be made of steel of suitable thickness, and it may be completely closed, as shown, or may be open at the base of the T. Any suitable method of manufacture can be employed, as for example, rolling a closed steel tube or forming the column by bending a flat sheet and welding together the edges of the formed shape to close the tube. The T-shaped column 13 includes a generally U-shaped rear or bottom section 21 which forms the base of the T. The front wall or surface 23 of the column forms the top of the T and a pair of sidewalls or surfaces 25 extend rearward from each side edge of the front wall and are perpendicular thereto. The rear edges of the sidewalls 25 are connected to the U-shaped bottom portion 21 by a pair of intermediate walls or surfaces 27 which are parallel to the front wall 23.

In the embodiment shown, a plurality of the columns 13 are used to support horizontal arms 11 which carry longitudinal rails 19 that run in a fore-and-aft direction in the overall storage structure, the U-shaped rear section 21 of the T-shaped column provides stability to the column design and support points for bracing members (not shown). Suitable braces extend between the column 13 shown and the next aligned column rearward thereof, which next column provides the adjacent support location for the longitudinal rail 19. In this respect, the U-shaped rear section 21 is provided with pairs of transversely aligned holes 19 which facilitate the connection of such bracing members via bolts or the like.

Two series of holes 31 are provided in the front sidewall 23 of the column along each side edge thereof. The holes 31 in the front surface are arranged in two vertical lines, one along each side edge, and the holes 31 in each line are spaced a predetermined distance from one another. Moreover, holes 33 are provided in the intermediate walls 27 which are horizontally and axially aligned with each of the holes 31 in the front wall, thereby constituting pairs of aligned holes. Additional apertures 35 are provided in the sidewalls 25 which may also be used for the connection of additional bracing members or for other connections, but these apertures 35 are not of specific importance relative to the structural lock connection which is the subject matter of this patent application.

The locking pin 15 includes first and second parallel legs 37, 39 which are interconnected by a central connecting section 41, the major portion of which is straight. As best seen in FIGS. 1 and 3, the central section 41 is offset slightly from the plane of the parallel legs 37, 39 as discussed further hereinafter. However, when a rectangular tube is used for the column 13 or when there is adequate clearance between the holes 33 and the rear section 21, the central pin section 41 may be coplanar with the legs 37, 39. The locking pin 15 is suitably bent from wire or rod of circular cross section having the desired diameter to be received in the circular holes 31, 33. The legs 37, 39 are equal in length and are proportioned so that when the locking pin 15 is fully inserted in the holes 31, 33 in the column, the free ends of the legs protrude a preselected distance from the surface of the front wall 23 of the column.

In the illustrated embodiment, the horizontal load support arm 11 is shown as a separate member to which the connector 17 is affixed. Although it might be possible to suitably cut and form the end of such a horizontal member into the shape of the connector and thus use a single integral element, for manufacturing convenience it is preferred to form the connector 17 separately and then suitably attached it to the end of the horizontal arm 11. In the illustrated embodiment, the short load support arm 11 is a downwardly open channel; however, any suitable shape, such as an angle iron or a closed tube, might be employed which would have the desired strength for the intended application. Likewise, the longitudinal rails 19 may be attached in any suitable manner to the horizontal arms 11. For example, in the illustrated embodiment, short bolts 43 extend downward through the web of the horizontal arm, and a nut is attached to their threaded ends.

The connector 17 is formed from a blank of flat steel or the like. The connector 17 includes a central vertical web 45 flanked by an arcuate element 47 formed along the rear edge thereof and a generally perpendicular flange 49 is formed along the front edge thereof. The arcuate element 47 is formed with a radius of sufficient dimension to fit around the curvature of the central section 41 of the locking pin 15, as best seen in FIG. 3.

The connector 17 is designed to be pivoted into its final lock position after the arcuate element 47 has been placed in engagement with the central section 41 of the locking pin, as illustrated in dotted outline in FIG. 3. So that there will be clearance between the free end of the arcuate element 47 and the outer surface of the U-shaped rear section 21 of the column, the central straight section 41 of the locking pin 15 is preferably offset slightly from the plane of the legs 37, 39. Furthermore, the free edge of the arcuate element 47 should not wrap too far around the central pin section 41 to interfere with the initial engagement of the connector, prior to pivoting.

The perpendicular flange 49 of the connector 17 is formed with two completely closed slots 51 which are formed with oblique camming edges 53 in the upper portions thereof. The slots 51 are of sufficient dimension to accommodate the ends of the pin legs 37, 39. As best seen in FIG. 2, when the lock is assembled and the horizontal arm 11 is loaded, the connector 17 slides slightly downward on the column 13, and the engagement between the camming edges 53 and the circular cross-sectional pin legs 37, 39 creates a very firm connection by drawing the adjacent corner of the connector 17 tightly against the corner of the vertical column 13. As a result, there is a tendency for the connector 17 to try to rotate about the corner that is resisted by the engagement between the central pin section 41 and the arcuate element 47, with the establishment of a very firm connection therebetween.

By forming completely closed slots 51 in the flange 49, as opposed to merely forming hooked members or slots with openings at some location below the camming edges, additional structural strength is incorporated into the connector 17. However, it is required that some provision be made for entry of the ends of the pin legs 37, 39 into the slots 51, inasmuch as the earlier engagement between the central section 41 of the pin and the arcuate element 17 precludes moving the slots axially into engagement with the pin ends (the manner in which the structural lock shown in previously mentioned U.S. Pat. No. 2,932,368 is usually assembled). Accordingly, entrance means is formed in the flange 49 of the connector by deforming the flange to provide a pair of tunnels 55 leading to the lower sections of the closed slots 51, at locations just below the camming edges 53. The tunnels 55 are formed with a sufficient depth to provide clearance for the ends of the pin legs 37, 39 which protrude a preselected distance from the surface of the column front wall 23. The tunnels 55 not only provide clearance for the pin leg ends, which permits the connector 17 to be pivoted from the intermediate position where the first planar connection is made to the final lock position shown in FIG. 3, but the tunnels 55 serve as an aid in establishing the lock connection by guiding the pin ends into the slots 51. In this respect, it is preferred that the upper and lower edges of the ends of the pin legs 37, 39 be relieved, at the location 57, as for example about a 1/16-inch radius. Accordingly, engagement between the curved inner surface of the tunnels 55 and the rounded pin ends facilitates the precise alignment of the connector 17 on the column 13 to bring it into the final position of the lock.

As previously indicated, once the connector 17 has been pivoted so that the central web 45 lies adjacent to the surface of the column sidewall 25, the protruding ends of the pin legs 37, 39 will lie below the camming edges 53 of the closed slots. Accordingly, the mere weight of the connector 17 and horizontal arm 11 alone is sufficient to cause the connector to drop into the lock position. Likewise, as soon as the horizontal arm 11 is loaded, as by disposing a palletized load on the rails 19, the camming action creates an extremely firm connection between the two inner surfaces of the connector 17 and the facing surfaces of the column 13 at the front corner and between the central pin element 41 and the arcuate element 47.

Although in FIG. 1, the rail 19 is shown attached to the horizontal load support arm 11 before the engagement of the horizontal arm to the column 13 is made in order to better illustrate the intended use arrangement of the overall structure, it should be understood that in most instances in the erection of a drive-in storage rack installation of this general type, the columns 13 would be first erected and braced. Then, the horizontal support arms 11 would be located at the desired vertical locations on the columns 13 the choice of vertical locations being afforded because of the series of holes 31, 33 provided therein. The rails 19 are usually finally supported on the horizontal arms 11 after the arms have been secured in place. Moreover, once the rail 19 is secured in place, inadvertent disengagement of the lock becomes impossible because, even though upward movement of the connector might conceivably occur, the connector must subsequently be pivoted to disengage it and the presence of the rail 19 prevents the occurrence of pivotal movement.

The illustrated structural lock provides an easily assemblable connection as a result of the fact that the planar connections adjacent the front and rear surfaces of the column 13 are made serially, with the pivoting movement in between. The lock is rigid and stable because of the effect of the camming connections and is secure because accidental disengagement is positively prevented. Moreover, the lock provides an extremely strong connection for support of a horizontal member 11 that may be though of as a cantilever arm. The points of connection are in two spaced, parallel planes which results in the provision of four separate shear points to resist the cantilever load. So as to split the total support load into four parts, the horizontal arm 11 is preferably affixed to the connector 17 at a location so that the load center of the support arm lies at a vertical level below the camming edge 53 in the lower of the pair of slots 51, as in the embodiment best seen in FIG. 1. By such an arrangement, the force supporting the load on the horizontal arm 11 is distributed among the four shear points where the pin legs 37, 39 pass through the walls of the column 13.

It can be seen that the overall design of the structural lock facilitates the attachment of two horizontal support arms 11 to a vertical column 13 at the same vertical location, one disposed at each side of the column. Such an arrangement is commonly used in a drive-in storage rack of the type illustrated in the previously mentioned U.S. Pat. No. 2,963,169, wherein such rails on opposite sides of the columns each serve to support palletized loads in adjacent aisles. Various modifications as would be obvious to one having the ordinary skill in the art may be made without departing from the spirit of the invention. For example, the column instead of being T-shaped could be made C-shaped by simply eliminating the rear U-shaped portion. Moreover, structurally strong columns of any suitable shape may be employed, even round or oval shapes so long as the connector is proportioned properly to fit around the column in flanking relation thereto.

Various of the features are set forth in the following claims.

What is claimed is:

1. A structural lock for connecting a horizontal load support member to a vertical column, which lock comprises a column having first and second generally parallel surfaces which are spaced apart by a third surface extending therebetween, pairs of horizontally aligned holes being provided in said first and second surfaces, each said pair of holes being spaced a predetermined vertical distance above or below another such pair, a generally U-shaped locking pin of generally circular cross section having a pair of parallel legs interconnected by a central element, said legs being spaced apart a distance equal to said predetermined distance and said legs each being of a length sufficient to protrude a preselected distance from said second surface when said locking pin is fully inserted into said column so that said central element lies generally adjacent said first surface, a horizontal load support member, and a connector affixed to the end of said support member having a central web adapted to generally abut said third surface of said column and a vertical flange along one side of said web which is adapted to lie generally adjacent said second surface, said connector having a vertically extending arcuate element formed along the opposite side of said web which is spaced from said flange a distance slightly greater than the spacing of said first and second column surfaces, said arcuate element being designed to fit over said central pin element and hold it entrapped therein when said web abuts said third surface of said column, said flange having a pair of slots formed therein which are vertically spaced apart a distance equal to said predetermined distance and which slots have camming edges which engage the protruding portions of said pin legs and draw said connector into firm contact with said column when a load is applied to said support member, and said flange also being formed with a pair of tunnels which lie out of the plane of said flange at a location below each of said camming edges to permit the entry of said protruding portions of said pin legs into said slots when said arcuate element is engaged with said pin central element and said support member is pivoted horizontally about said column to bring said web adjacent said column third surface.

2. A structural lock for connecting a horizontal load support member to a vertical column, which lock comprises a column having first passageway means extending generally horizontally therethrough, a locking pin having a first leg section and a generally straight section connected to said leg section, said leg section being of a length sufficient to extend through said first passageway means in said column and protrude a preselected distance from the surface thereof when said locking pin is fully inserted into said column, and a horizontal load support member which is provided at one end thereof with first and second engaging means which are spaced sufficiently far apart to flank portions of said column, said first engaging means being designed to form a pivotal connection about a vertical axis with said straight section of said pin, and said second engaging means being a closed slot having a camming edge in its upper portion which slot is formed in a flat surface adapted to lie vertically adjacent said column, said flat surface being deformed to provide tunnel means therein leading to the lower portion of said closed slot, said tunnel means providing clearance for the protruding end of said first pin leg when said first engaging means pivotally engages said straight section and said horizontal member is pivoted into locking position with said column.

3. A structural lock in accordance with claim 2 wherein said column is provided with second passageway means spaced a predetermined distance vertically below said first passageway means and wherein said locking pin has a second leg section generally parallel to said first leg section and disposed at the opposite end of said generally straight section, said second leg section being spaced said predetermined distance from said first leg section and being adapted to reside in said second passageway means when said first leg section is fully inserted in said first passageway means.

4. A structural lock in accordance with claim 2 wherein said locking pin is circular in cross section and wherein said first engaging means has an arcuate vertically extending inner surface having a curvature greater than the radius of said pin circular cross section.

* * * * *